United States Patent [19]

Kirk

[11] Patent Number: 5,187,256
[45] Date of Patent: Feb. 16, 1993

[54] UNIFORM DISTRIBUTION POLYCARBONATE PELLET

[75] Inventor: Richard O. Kirk, Lake Jackson, Tex.

[73] Assignee: The Dow Chemical Company, Midland, Mich.

[21] Appl. No.: 621,705

[22] Filed: Dec. 3, 1990

[51] Int. Cl.$^5$ .............................................. C08G 64/40
[52] U.S. Cl. .................................... 528/196; 428/12; 525/394; 525/433; 525/439; 525/462; 525/468; 528/204; 528/502
[58] Field of Search ...................... 528/196, 204, 502; 525/462, 468, 433, 439, 394; 428/412

[56] References Cited

U.S. PATENT DOCUMENTS

| | | | |
|---|---|---|---|
| 3,954,713 | 5/1976 | Schnöring et al. | 528/196 |
| 4,074,864 | 2/1978 | Narita | 241/23 |
| 4,184,911 | 1/1980 | Koda | 159/47 R |
| 4,568,418 | 2/1986 | Walko et al. | 528/196 |
| 4,699,745 | 10/1987 | Fritsch et al. | |

FOREIGN PATENT DOCUMENTS

| | | |
|---|---|---|
| 61-28529 | 2/1986 | Japan. |
| 62-160210 | 7/1987 | Japan. |
| 62-619605 | 7/1987 | Japan. |
| 63-03021 | 1/1988 | Japan. |
| 2022600 | 12/1979 | United Kingdom. |

OTHER PUBLICATIONS

Patent Abstracts of Japan, vol. 13, No. 560 (M-906)(3908) Dec. 13, 1989 & JP-A-1234212 (Mitsubishi Yuka Badische Co. Ltd.) Sep. 19, 1989.
World Patents Index Latest, Week 8612, Derwent Pub. Ltd., London, GB; AN 86-078558 & JP-A-61027209 (Mitsubishi Chem Ind KK) Feb. 6, 1986.
Patent Abstracts of Japan, vol. 11, No. 101 (C-413)(2548) Mar. 31, 1987 & JP-A-61250026 (Mitsubishi Gas Chem Co Inc) Nov. 7, 1986.
Patent Abstracts of Japan, vol. 13, No. 11 (C-558)(3359) Jan. 11, 1989 & JP-A-63218730 (Teijin Chem Ltd) Sep. 12, 1988.
Patent Abstract of Japan, vol. 11, No. 393 (M-654)(2840) Dec. 23, 1987 & JP-A-62160210 (Mitsubishi Gas Chem Co Inc) Jul. 16, 1987.
Plastics Engineering, vol. 31, No. 8, Aug. 1975, Greenwich, Conn., U.S., pp. 38–42.

Primary Examiner—Harold D. Anderson
Attorney, Agent, or Firm—John A. Langworthy

[57] ABSTRACT

A polycarbonate pellet having a size between 200 and 1,500 microns, not inclusive, is produced by extruding molten polycarbonate through a die and cutting such extrudate with a die face cutter.

33 Claims, No Drawings

UNIFORM DISTRIBUTION POLYCARBONATE PELLET

FIELD OF THE INVENTION

This invention relates to a method of producing polycarbonate in the form of pellets having a specified size range and distribution, and to the polycarbonate pellets having such size range and distribution.

BACKGROUND OF THE INVENTION

Polycarbonate can be prepared for shipment by manufacturers in forms which differ to a significant degree in terms of size. For example, polycarbonate pellets which are too large to pass through a sieve having a mesh opening size in the range of about 2.5 to 4 mm are known. However, polycarbonate in powder form is also known where the granules may range in size from less than 100 to as much as 2,000 microns.

Polycarbonate in powdered form is typically prepared by chopping or crushing polycarbonate which is not melted or dissolved. For example, in Narita, U.S. Pat. No. 4,074,864, methods and apparatus are disclosed for continuous production of polycarbonate powder from a polycarbonate solution. This involves mixing and kneading a polycarbonate solution while heating same and while simultaneously repeating the feeding of the solution forward and backward with the aid of meshing spiral blades in a twin screw extruder. As the solvent in the polycarbonate solution is evaporated by the applied heat, the product undergoes drying, grinding and powdering and is then discharged through an outlet in powder form. Although the polycarbonate powder is reported in Narita to have an average grain size of 1,700 microns, a minor portion of it is as small as 200 mesh or less. Koda, U.S. Pat. No. 4,184,911, also discloses a process for producing powdery polycarbonate from a polycarbonate solution by (a) charging the solution into a desolvating apparatus which is constituted of at least two intermeshing screws in a casing, the casing having an evaporating zone and a powdering zone: (b) evaporating the solvent in the evaporating zone by crushing between the screws: (c) powdering the dried polycarbonate in the powdering zone: and (d) discharging the powdery polycarbonate from the product exit in the powdering zone.

Handling any substance in powder form presents a problem with dust (extremely fine particles which become airborne) and the consequent loss of material and increased difficulty of housekeeping. Material in powder form is also more difficult to clean from an extruder when there is a change of feedstock and is frequently more difficult to melt uniformly in an extruder. Although polycarbonate in pellet form is generally not subject to such difficulties as are inherent in powder, even the usefulness of polycarbonate pellets often depends on the appropriateness of the pellet size for the intended operation. For example, pellets which have too broad a size distribution are more difficult to convey in a pneumatic system than pellets which are 85% or more within a specified size range.

Accordingly, it would be desirable to have an easily practiced method of producing polycarbonate in the form of pellets characterized by specified size range and distribution so that the convenience of being able to handle polycarbonate in pellet form would be available regardless of the size of pellet needed.

SUMMARY OF THE INVENTION

In one aspect, this invention involves a composition of matter comprising polycarbonate pellets characterized in that (a) the median particle size of said pellets is between 250 and 1,000 microns: (b) the particle size dispersion of said pellets is less than 100 microns: and (c) the skew of the particle distribution is less than 0.25: each as determined according to ASTM Designation D 1921-63.

This invention also involves a composition of matter comprising polycarbonate pellets characterized in that, (a) after said polycarbonate pellets have been agitated on a screen having a mesh opening size of 850 microns, and after those pellets not retained on said 850 micron screen have then been agitated on a screen having a mesh opening size of 710 microns, the portion of said pellets which together is retained on one or the other of said screens is more than 85% by weight: and (b) none of said pellets are retained after agitation on a mesh screen having a mesh opening size of 1,500 microns or more.

Further, this invention involves a polycarbonate pellet characterized in that (a) it is retained after agitation on a mesh screen having a mesh opening size within the range of 200-1,000 microns: (b) it is not retained after agitation on a mesh screen having a mesh opening size of 1,500 microns or greater: and (c) it is formed by cutting polycarbonate which has been forced through a die.

In another aspect, this invention involves a process for preparing polycarbonate pellets comprising (a) melting polycarbonate in an extruder; (b) forcing such melted polycarbonate through a die having die holes with a diameter of about 0.25 to about 0.8 mm to form an extrudate; and (c) cutting such polycarbonate extrudate to form pellets.

The methods of this invention are useful for producing polycarbonate pellets, such pellets being useful, for example, in the production of films, extruded sheets, multi-layer laminates and molded or shaped articles of virtually all varieties, especially appliance and instrument housings, automobile body panels and other components for use in the automotive and electronics industries.

DESCRIPTION OF THE INVENTION

This invention involves the production of polycarbonate in pellet form. A polycarbonate pellet of this invention, being that which is produced by the methods of this invention, is characterized by a size which is less than about 1,500 microns, is advantageously less than about 1,000 microns, is preferably less than about 900 microns, and is more preferably less than about 800 microns, but is as well greater than about 200 microns, is advantageously greater than about 500 microns, is preferably greater than about 600 microns, and is more preferably greater than about 700 microns. Size in this respect is determined by whether a pellet passes through, or is retained, as a result of agitation on a sieve or screen having a mesh opening size as stated. If the pellet passes through the sieve or screen, it is described as having a size which is equal to or less than that of the mesh opening, and if the pellet is retained, it is described as having a size that is greater than the mesh opening. However, a polycarbonate pellet of this invention is not retained after agitation on a sieve or screen having a mesh opening size of 1,500 microns or greater.

The size characteristics of a sample, assay or specimen of polycarbonate pellets of this invention may be described by measurements made according to ASTM Method D 1921-63. This method involves use of a mechanical sieve-shaking device which imparts a uniform rotary motion to a group of sieves. The sieves are nested together in order of diminishing mesh opening size with a collection pan on the bottom. Those pellets which pass through one sieve are agitated on the sieve below, and so on until all pellets are either retained on a screen or drop to the collection pan. The number and mesh opening sizes of the sieves are selected based on the expected range of particle sizes of the pellets to be analyzed. The results obtained from this test are the median particle size of the sample studied, the dispersion of particle sizes across the whole sample, and the skew of the particle distribution. Median size and particle size dispersion are both expressed in microns ("$\mu$", $10^{-6}$ meters). Skew is unitless. These characteristics are frequently determined with reference to a parcel, batch or lot of polycarbonate pellets weighing at least about 150 pounds, advantageously at least about 300 pounds, preferably at least about 750 pounds, and more preferably at least about 1,500 pounds, although it is not required that the batch or sample be any particular weight.

A sample or batch of the polycarbonate pellets of this invention has, according to ASTM Method D 1921-63, (i) a median particle size of about 250 to 1,000 microns, advantageously a median particle size of about 500 to 900 microns, preferably a median particle size of about 600–800 microns, and more preferably a median particle size of about 650–750 microns; (ii) a particle size dispersion of less than about 100 microns, advantageously less than about 60 microns, and preferably less than about 40 microns: (iii) a particle distribution skew of less than about 0.25, advantageously less than about 0.1, preferably less than about 0.05, and more preferably zero.

A parcel or assay of the polycarbonate pellets of this invention is further characterized in that, when said polycarbonate pellets are agitated on a screen having a mesh opening size of 850 microns, and when those pellets not retained on said 850 micron screen are then agitated on a screen having a mesh opening size of 710 microns, the portion of said parcel or assay of pellets which together is retained on one or the other of said screens is more than about 85% by weight, is advantageously more than about 90% by weight, is preferably more than about 95% by weight, and is more preferably more than about 98% by weight.

The polycarbonate pellets of this invention are formed by cutting polycarbonate to the desired size after it has been forced through a die. This is typically accomplished by melting polycarbonate in heating means such as a screw-type extuder whereby the polymeric material is melted in a heated barrel and is, in molten form, forced through a die with openings of a size appropriate to obtain a pellet of the size desired. Pressure on the molten extrudate to force it through the die can be supplied, for example, by a screw (a rotating internal member with raised spiral flights) and/or by an optional gear pump. The polycarbonate when fed into an extruder for melting will typically already have been dried of solvent, and (although it is not required for purposes of this invention) the polycarbonate will typically have a solvent content of not more than 1.0% by weight, and preferably not more than 0.1% by weight.

The methods of this invention for producing polycarbonate pellets within the size ranges set forth above involve steps to adjust the temperature of the polycarbonate melt for the purpose of attaining temperature uniformity within the extruder or other melting device, and controlling the viscosity of the melt. The methods of this invention also involve control of the flow rate at which the melted polymer exits the die, and the frequency with which the melted polymer is cut to form pellets.

Back pressure in an extruder is typically increased when die hole size is decreased. Pressure can be measured by a Bourdon-type or other pressure gauge mounted in the extruder barrel. (If desired, a needle or gate valve can be used to adjust pressure inside the extruder, or a gear pump can be used to boost pressure.) The smaller die hole used to obtain the pellets of this invention is typically about 0.25 to about 0.8 mm in diameter, is advantageously about 0.5 to about 0.75 mm in diameter, and is preferably about 0.6 to about 0.7 mm in diameter.

In and of itself, use of a smaller die hole typically not only increases back pressure but also reduces flow rate out of the die. Reduced flow rate has the benefit of allowing more time for mixing of the melt within the extruder, which promotes temperature uniformity. However, it may be desirable to utilize an increase in screw speed to maintain flow rate and compensate for the increased back pressure caused by use of a smaller die hole. This results in more power being used to run the screw with the consequence of more shear heating. Conductive heating from the barrel may therefore be reduced as shear heating increases from increased back pressure, particularly after the solid bed has broken up and melting is complete. However, the barrel heat should be no lower than a level which, together with the shear heat, maintains a visosity low enough that the melted polymer can be readily forced through the die at an appropriate flow rate in relation to the frequency of cutting and the pellet size desired. The temperature of the polymer in an extruder can be measured by a pyrometer in the barrel, such as a thermocouple, or by a manual probe.

Barrel heater bands as a source of heat in an extruder should be adjusted so that conductive heat supplied from the barrel in the melting section is sufficient to aid in formation of a molten film near the barrel surface. This avoids excessive shearing within the solid bed which would increase mechanical work input and the heat generated by shearing action of the polymer to an undesirable level. To the extent that heat supplied by the barrel can be held to a minimum so that it does not compete with, but rather supplements, the heat generated by the shearing action, proportionally more of the heat will come from the one source of shearing, making it easier for temperature uniformity to be achieved by thorough mixing of the melt. Supplying just enough conductive heat through the barrel to maintain the temperature of the polycarbonate just above its softening temperature is a good measure of the heat input required from the barrel heaters. The heat derived from the barrel heaters and from shearing action should together be sufficient, in relation to the melt flow value of the polymer, to keep the viscosity of the polymer low enough that a rate of flow out of the die is established which is appropriate, in relation to the frequency of cutting the extrudate, for the size of pellet desired.

Attempting to overcome temperature non-uniformity in the melt by adding heat at the die is generally not a desirable practice. The die should be held at a temperature which will maintain the target temperature of the melt in the forward section of the barrel as it approaches the die. Since the melt cannot be mixed in the die, and because the conduction path length varies in the die from one die opening to another, the application of extra heat at that point typically only aggravates the problem of temperature non-uniformity.

After the molten polycarbonate is forced through a die, by extrusion or other means, it can be pelletized. Pelletization can be performed in a variety of different ways. The molten extrudate can either be cut as it emerges from a die, or it can be cooled and hardened in a water bath in the form of a strand which is cut. When the molten extrudate is cut at the face of the die, a stream or spray of air and/or water is directed at the cutting site to help cool the pellets and move them toward a discharge chute. The pellets may then go into a slurry where further quenching will occur. Quenching will help solidify the exterior shell of the pellet so that agglomeration is prevented, although there is usually enough residual heat content in the interior portion of the pellet so that moisture remaining on the surface of pellet after removal from the slurry will evaporate. Systems are also known where cutting actually occurs under water, and the pellets are quenched and go into a slurry immediately upon being cut.

Molten extrudate out at the die face is, in most instances, cut by a rotating circular multiple blade knife. However, pelletizers are also known which employ a rotary, screw-shaped knife at the die face, or a helically-grooved cutter may be disposed about a cylindrical die. In the case of a centrifugal pelletizer, however, the polymer melt is fed into a rotating die and is forced through peripheral holes in the die as it spins. The emerging extrudate is cut by a stationary knife as each die hole spins past. When the die is spinning fast enough to force the extrudate out of the die holes, sufficient angular momentum is imparted to pellets formed by a spinning die to cause them to be thrown into the quenching bath or slurry without need for as much direct assistance from an air and/or water stream.

When using a pelletizer which has a spinning blade, sufficient angular momentum must be imparted by the blade to the pellets so that they are cast into the quenching system quickly enough that any tendency to agglomerate is substantially avoided. A blade speed of at least about 2,500 rpm, and preferably at least about 3,000 rpm, is typically needed to obtain a cutting frequency which not only produces the desired pellet size but imparts angular momentum to the cut pellets sufficient to substantially avoid a problem of agglomeration. An upward adjustment in blade speed may be needed if the extrudate is higher in the range of acceptable viscosities because more of the energy causing the blade to spin will be absorbed in cutting than in the case of an extrudate which is lower in the appropriate viscosity range. If too much energy is absorbed in cutting, insufficient angular momentum may be imparted to the pellet to allow it to be hurled into the slurry without agglomeration. A tendency toward agglomeration of the pellets may also exist if the die holes are too close together. Die holes should be spaced a minimum of at least about 4.0 mm, and preferably at least about 5.0 mm, measured center line to center line. Blade speed should also be adjusted in relation to the flow rate at which the polymer exits the die so that the frequency with which the extrudate is cut produces a pellet of the desired size.

The pellets of this invention are typically cylindrical in shape, i.e. shaped like a circular column, but may also be shaped like an eliptical column or an oblate spheroid. The length/diameter (L/D) ratio of a cylindrical pellet is preferably 1/1 but may vary from as much as 2/1 to ½. A geometrically correct right cylinder may, in one aspect, be considered to be a circular column having a top and bottom surface each formed by a flat circle and a shaft or body, extending between said flat circular ends, defined by parallel sides. The shape of the cylindrical pellets of this invention may vary from that of such a right cylinder in numerous ways while nevertheless remaining substantially cylindrical. Representative examples of such variances in shape may take the form of a top and/or bottom which is not flat but rather has a convex, domed shape where the point of greatest deviation of the top above a flat surface, or the bottom below a flat surface, is typically no more than 3L/8, and is more typically no more than L/4. Such deviation of the top and/or bottom of a cylindrical pellet of this invention from a flat surface may be the same or different. The sides of the shaft or column of a cylindrical pellet of this invention may not be truly parallel but may rather, by way of further example, be slightly concave. The point of greatest deviation of such a concave side from the line of a parallel side is typically disposed inward toward the center line of the cylinder no more than D/8, and more typically no more than D/16. The amount of such deviation from the parallel of the sides of the shaft or column of a cylindrical pellet of this invention may or may not be constant about the circumference of the cylindrical shaft or column. However, the top, bottom and side surfaces of the cylindrical pellets of this invention, when compared for example to powdered polycarbonate, are smooth with no strings, jags or pointed protrusions.

The polycarbonate involved in this invention is typically prepared from an aromatic dihydroxy compound which is reacted with a carbonate precursor, such as a carbonic acid derivative. A carbonic acid derivative such as the carbonyl halide phosgene is useful for such purpose. However, even with the application of heat, the direct contact of an aromatic dihydroxy compound and a carbonic acid derivative does not produce a reaction with a rate sufficient to form polycarbonate. The reaction should therefore be facilitated by the presence in the reaction mixture of pyridine or another tertiary amine. The salt-like adduct of the carbonic acid derivative which is formed with the amine reacts more favorably with the dihydroxy compound than the carbonic acid derivative itself. The reaction should be carried out in the absence of water to avoid hydrolysis of the carbonic acid derivative, and a non-reactive organic solvent is used which will keep the polycarbonate product in a viscous solution as it forms. The non-reactive solvent is frequently methylene chloride or another halogenated hydrocarbon, or benzene or toluene. When the formation of polycarbonate is complete, the reaction mixture is washed with an aqueous solution of a mineral acid to convert any remaining amine to its corresponding salt, and the organic phase is washed further with water to remove acidic electrolytes. The solvent can be removed from the organic phase by distillation. Alternatively, the polycarbonate may be precipitated from the organic phase by a non-solvent such as petroleum ether, methanol, isopropanol or an aliphatic hydrocarbon.

However, even at temperatures as low as from 0° C. to 40° C., a carbonic acid derivative reacts at a better rate with deprotonated aromatic dihydroxy compounds than it does in a non-aqueous system. A solution is formed of (i) an aromatic dihydroxy compound and a strong base in aqueous phase, and (ii) an inert, immiscible organic solvent which will dissolve both the carbonic acid derivative and the polycarbonate product. Solvents such as xylene or methylene chloride or other chlorinated hydrocarbons are suitable for such purpose. Caustic such as the alkali or alkaline earth carbonates, oxides or hydroxides function best as the base, the total amount of which may be added at the beginning of, or incrementally during, the reaction. A pH of about 10 to 13 is typically maintained throughout the reaction. The base forms the dianion of the aromatic dihydroxy compound in the aqueous phase, and the aqueous phase forms a continuous phase with the organic solvent dispersed, upon agitation, as droplets therein. Carbonic acid derivative is bubbled into this mixture, is dissolved in the organic solvent, and reacts with the aromatic dihydroxy compound at the interface of the droplets with the aqueous phase. Catalysts accelerate the rate of the reaction sufficiently to allow the formation of high polycarbonates at the same low temperature at which the reaction began. Suitable catalysts for such purpose are tertiary amines such as triethylamine or N,N-dimethyl-cyclohexylamine, or quaternary ammonium bases such as tetramethyl ammonium hydroxide or triethyl benzyl ammonium hydroxide, or quaternary phosphonium, quaternary arsenium or tertiary sulfonium compounds. A bisaryl ester can be used in place of a carbonic acid derivative.

Polycarbonate can additionally be made by transesterification, which is accomplished by reacting a dihydroxy compound with a bis carbonic acid ester. A strongly alkaline catalyst such as the alkali metals and the alkaline earth metals and their oxides, hydrides or amides, or the basic metal oxides such as zinc oxide, lead oxide and antimony oxide is used as an accelerator, and the reaction is run at temperatures of between 150° C. and 300° C., using vacuum to remove the residue of the bis carbonic acid ester. At temperatures between 150° C. and 200° C., low molecular weight polycarbonate terminated with bis carbonic acid ester groups is formed, which can then interreact at temperatures above 250° C. to form higher weight polycarbonate by splitting off the original bis carbonic acid ester. This process is carried out at reduced pressure.

Suitable dihydroxy compounds for the preparation of polycarbonate are those wherein the sole reactive groups are two hydroxyl groups, such as variously bridged, substituted or unsubstituted aromatic diols (or mixtures thereof) represented by the general formula

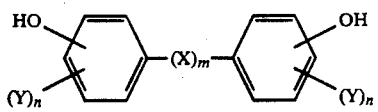

where (a) X is a substituted or unsubstituted divalent hydrocarbon radical containing 1–15 carbon atoms, or is a mixture of more than one of such radicals, or is —S—, —S—S—, —SO—, $SO_2$—, —O—, —CO—, or a single bond: (b) Y is independently a halogen such as fluorine, chlorine, bromine or iodine: or is a monovalent organic radical such as an alkyl group of 1–4 carbons, an aryl group of 6–8 carbons (e.g. phenyl, tolyl, xylyl or the like), an alkoxy group of 1–4 carbons, or an aryloxy group of 6–8 carbons: and (c) m is 0 or 1, and n is 1–4 inclusive. When n is less than 4, the other position(s) is/are occupied by hydrogen.

The carbonate polymers employed in the present invention can also be based on dihydroxy benzenes such as pyrocatechol, resorcinol and hydroquinone (and their halo- and alkyl-substituted derivatives), and on dihydroxy naphthalenes and anthracenes. The carbonate polymers employed in the present invention can also be linear or branched.

The preferred polycarbonate for use in this invention is an "aromatic polycarbonate", which is defined with reference to the oxygen atoms, of the residues of the one or more dihydroxy compounds present in the polycarbonate chain, which are bonded to a carbonyl carbon. In an aromatic polycarbonate, each such oxygen atom is bridged to the next such oxygen atom by a dihydroxy compound residue some portion of which is an aromatic ring. Representative examples of such a dihydroxy compound residue, having a portion which is an aromatic ring, are included in the bisphenols described by the structure above.

Although the polycarbonates mentioned above, such as those derived from 2,2-bis(4-hydroxyphenyl)propane ("Bisphenol-A") or from 1,1-bis(4-hydroxyphenyl)-1-phenyl ethane ("Bisphenol-AP"), can each be employed in this invention as a homopolymer (i.e. the product obtained when only one dihydroxy compound is used to prepare the polycarbonate), the carbonate polymers used herein can also be derived from two or more different dihydroxy compounds, or mixtures thereof, in the event a carbonate copolymer or interpolymer rather than a homopolymer is desired. For example, a typical copolymer is that which is made from Bisphenol-A and 2,2-bis(3,5-dibromo, 4-hydroxyphenyl)propane ("Tetrabromo Bisphenol-A") wherein either co-monomer can be present in a 1-99 or 99-1 molar ratio.

Copolymers can also be formed when a bisphenol is reacted with a carbonic acid derivative and a polydiorganosiloxane containing α,ω-bishydroxyaryloxy terminal groups to yield a siloxane/carbonate block copolymer (as are discussed in greater detail in Paul, U.S. Pat. No. 4,569,970, incorporated as a part hereof), or when a bisphenol is reacted with a bis(ar-haloformylaryl) cartonate to yield an alternating copolyestercarbonate, the bis(ar-haloformylaryl) carbonate being formed by reacting a hydroxycarboxylic acid with a carbonic acid derivative under carbonate forming conditions. Copolyestercarbonates are discussed in greater detail in Swart, U.S. Pat. No. 4,105,533, incorporated as a part hereof.

Also useful in this invention are physical blends of two or more of the carbonate homo- and/or copolymers described above. The term "polycarbonate" as used herein, and in the claims appended hereto, should therefore be understood to include carbonate homopolymers, carbonate copolymers (as described above), and/or blends of various carbonate homopolymers and/or various carbonate copolymers.

The methods generally described above for preparing carbonate polymers suitable for use in the practice of this invention are well known: for example, several methods are discussed in detail in Schnell, U.S. Pat. No. 3,028,365: Campbell, U.S. Pat. No. 4,384,108: Glass, U.S. Pat. No. 4,529,791; and Grigo, U.S. Pat. No.

4,677,162, each of which is incorporated as a part hereof.

Blends of polycarbonate and other polymers are also suitable for formation of the pellets of this invention. Other polymers suitable for preparing such blends with polycarbonate include, but are not limited to, the following:

polyacetal, including that which is formed by the bond opening and polymerization of the carbonyl group of an aldehyde to give a —(—$CH_2$—O—)—repeating unit, as well as the reaction products of polyols and aldehydes;

polyacrylate;

polyamide, including that which is prepared by the reaction of a diamine and diacid or the self polymerization of a cyclic lactam;

polyester, including that which is prepared by the condensation reaction of a diacid and a diol or the self esterification of a hydrocarboxylic acid, and copolymers thereof;

poly(ethylene oxide);

polymethacrylate;

polyolefin, including copolymers thereof;

poly(phenylene ether), including that which is prepared by the oxidative coupling polymerization of a phenol to give a —(—$_p$Ar—O—)—repeating unit;

polystyrene, including copolymers thereof;

polyurethane, including that which is prepared by the reaction of a diisocyanate and a polyol; and vinyl polymers, including poly(vinyl acetate), poly(vinyl alcohol), poly(vinyl amide), poly(vinyl chloride), and poly(vinyl ether), including copolymers of each; where Ar in the foregoing list of polymers is an aromatic organic (e.g., $C_6$–$C_{10}$) radical.

Numerous additives are available for use in the compositions of this invention for a variety of purposes including protection against thermal, oxidative and ultra-violet degradation. Representative of thermal and oxidative stabilizers which can advantageously be utilized herein are hindered phenols, hydroquinones, phosphites, including substituted members of those groups and/or mixtures of more than one thereof. A preferred phenolic anti-oxidant is Irganox ™ 1076 anti-oxidant, which is available from Ciba-Geigy Corp. and is discussed in greater detail in U.S. Pat. Nos. 3,285,855 and 3,330,859, each being incorporated herein. Ultra-violet light stabilizers such as various substituted resorcinols, salicylates, benzotriazoles, benzophines and hindered phenols can also be usefully included herein, as can be lubricants; colorants: fillers such as talc; pigments; ignition resistance additives: mold release agents; and reinforcing agents such as fiberglass. Additives and stabilizers such as the foregoing, and others which have not been specifically mentioned, are known in the art, and the decision as to which, if any, to use is not critical to the invention. However, such additives, if used, will typically not exceed 50% by weight of the total composition, and preferably will not exceed 30% by weight thereof.

Illustrative Embodiments

To illustrate the practice of this invention, examples of several preferred embodiments are set forth below. It is not intended, however, that these examples (Examples 1-16) invention. Some of the particularly desirable features of this invention may be seen by contrasting the characteristics of Examples 1-16 with those of various controlled formulations (Controls A-G) which do not possess the features of, and are not therefore embodiments of, this invention.

Numerous samples of polycarbonate, and a sample of a blend of polycarbonate and an acrylonitrile/butadiene/styrene ("ABS") copolymer, were tested for particle size by ASTM Method D 1921-63. This method involves use of a mechanical sieve-shaking device which imparts a uniform rotary motion to a group of sieves. The sieves are nested together in order of diminishing mesh opening size with a collection pan on the bottom. The number and mesh opening sizes of the sieves are selected based on the expected range of particle sizes. The results obtained from this test are the median particle size of the sample studied, the dispersion of particle sizes across the whole sample, and the skew of the particle distribution. Median size and particle size dispersion are both expressed in microns ("$\mu$", $10^{-6}$ meters). Skew is unitless. The melt flow rate ("MFR") for polycarbonate is determined according to ASTM Designation D 1238-89, Condition 300/1.2.

Controls A-F

Samples of several commercially available brands of polycarbonate resin were tested for particle size according to the method described above. These samples were in powdered form when obtained and could be subjected to sieve testing without further processing. The median particle size, particle size dispersion and skew are shown for Controls A-F in Table I. The respective weight percentages of the sample retained on the various sieves of decreasingly smaller mesh size, and the density, are shown for Controls A-F in Table II.

TABLE I

Median Particle Size, Dispersion, Skew and Density for Controls A-F

| | Median particle size in microns | Particle size dispersion in microns | Skew | Density, lbs/ft$^3$ |
|---|---|---|---|---|
| Control A | 345 | 205 | 0.34 | 26.2 |
| Control B | 175 | 126 | 0.31 | 42.5 |
| Control C | 490 | 430 | 0.23 | 43.7 |
| Control D | 940 | 430 | 0.07 | 32.5 |
| Control E | 630 | 438 | 0.19 | 39.3 |
| Control F | 220 | 125 | 0.28 | 35.0 |

TABLE II

Percent Retained on Screen for Controls A-F

Percent of sample retained on each sieve (mesh size in microns)

| | 2,000 | 1,400 | 1,000 | 850 | 710 | 500 | 250 | 106 | <106 |
|---|---|---|---|---|---|---|---|---|---|
| Control A | 0 | 0 | 2.12 | 3.89 | 3.39 | 11.65 | 52.02 | 26.28 | 0.65 |
| Control B | 0 | 0 | 0.50 | 0.55 | 0.58 | 1.32 | 33.93 | 42.18 | 20.94 |
| Control C | 0 | 4.83 | 7.15 | 12.79 | 7.61 | 15.11 | 22.62 | 20.85 | 9.04 |
| Control D | 0.44 | 16.21 | 18.55 | 24.42 | 7.95 | 18.59 | 11.56 | 1.95 | 0.33 |
| Control E | 0 | 9.60 | 12.03 | — | 23.69 | 14.74 | 24.30 | 13.57 | 2.07 |
| Control F | 0 | 1.61 | 3.27 | — | 15.44 | 14.94 | 35.95 | 24.78 | 4.01 |

Controls A-F show the relatively large particle size dispersion and skew which is characteristic of powdered polycarbonate.

EXAMPLE 1

Polycarbonate with a melt flow rate of 3.0 was fed to a 3½ inch diameter single screw extruder at the average rate of 364 lbs/hour. The molten polycarbonate was extruded through a die housing containing 392 die holes having a diameter of 0.028 inch. The extruded polycarbonate was cut into pellets at the die face. The median particle size, the particle size dispersion and the skew of the particle distribution for Example 1 are shown below in Table III.

EXAMPLE 2

Polycarbonate with a melt flow rate of 13.5 was fed a 2½ inch diameter single screw extruder at the average rate of 150 lbs/hour. The molten polycarbonate was extruded through a die housing containing 99 die holes having a diameter of 0.031 inch. The extruded polycarbonate was cut into pellets at the die face. The median particle size, the particle size dispersion and the skew of the particle distribution for Example 2 are shown below in Table III.

EXAMPLE 3

Polycarbonate with a melt flow rate of 13.5 was fed to a 2½ inch diameter single screw extruder at the average rate of 60 lbs/hour. The molten polycarbonate was extruded through a die housing containing 99 die holes having a diameter of 0.031 inch. A hot face cutter was used to cut the extruded polycarbonate into pellets at the die face. The median particle size, the particle size dispersion, the skew of the particle distribution, and the density for Example 3 are shown below in Table III. The respective weight percentages retained on the various sieves of decreasingly smaller mesh size are shown for Example 3 in Table IV.

EXAMPLE 4

Polycarbonate with a melt flow rate of 14.5 was fed to a 90 mm diameter twin screw extruder at the average rate of 495 lbs/hour. The molten polycarbonate was extruded through a die housing containing 280 die holes having a diameter of 0.027 inch. A hot face cutter having eight cutting blades, and rotated at 4,200 rpm, was used to cut the extruded polycarbonate into pellets at the die face. The median particle size, the particle size dispersion, the skew of the particle distribution, and the density for Example 4 are shown below in Table III. The respective weight percentages retained on the various sieves of decreasingly smaller mesh size are shown for Example 4 in Table IV.

TABLE III

Median Particle Size, Dispersion, Skew and Density for Examples 1-4

| | Median particle size in microns | Particle size dispersion in microns | Skew | Density, lbs/ft$^3$ |
|---|---|---|---|---|
| Example 1 | 920 | 45 | 0.11 | — |
| Example 2 | 880 | 60 | 0 | — |
| Example 3 | 860 | 45 | 0 | 42 |
| Example 4 | 860 | 55 | −0.09 | 43.7 |

TABLE IV

Percent Retained on Screen for Examples 3 and 4

Percent of sample retained on each sieve (mesh size in microns)

| | 2,000 | 1,000 | 850 | 710 | 500 | 250 |
|---|---|---|---|---|---|---|
| Example 3 | 0 | 0 | 66.2 | 30.9 | 2.8 | 0 |
| Example 4 | 0 | 0.11 | 51.62 | 46.03 | 2.21 | 0.03 |

CONTROL G and EXAMPLES 5-9

Polycarbonate with a melt flow rate of 3.0 was fed to a 3½ inch diameter single screw extruder at the average rate of 364 lbs/hour. The molten polycarbonate was extruded through a die housing containing 392 die holes having a diameter of 0.028 inch. A hot face cutter having four or eight cutting blades, and rotated at different speeds, was used to cut the extruded polycarbonate into pellets at the die face. The median particle size, the particle size dispersion, the skew of the particle distribution, the cutter speed, the number of blades, the melt flow value, the extruder feed rate and the density are shown below for Control G and Examples 5-9 in Table V. The respective weight percentages retained on the various sieves of decreasingly smaller mesh size is shown below for Control G and Examples 5-9 in Table VI.

TABLE V

Control G and Examples 5-9

| | Median particle size in microns | Particle size dispersion in microns | Skew | Density, lbs/ft$^3$ | Cutter speed, rpm | Number of cutter blades |
|---|---|---|---|---|---|---|
| Control G | 1,000 | 500 | 0.68 | 26.8 | 2,000 | 8 |
| Example 5 | 850 | 40 | 0.25 | 44.3 | 3,600 | 4 |
| Example 6 | 780 | 40 | 0 | 43.7 | 3,600 | 8 |
| Example 7 | 780 | 40 | 0 | 43.7 | 3,300 | 8 |
| Example 8 | 800 | 40 | 0 | 43.7 | 3,000 | 8 |
| Example 9 | 890 | 95 | 0.16 | 40.6 | 2,500 | 8 |

TABLE VI

Control G and Examples 5-9

Percent of sample retained on each sieve (mesh size in microns)

| | 2,000 | 1,000 | 850 | 710 | 500 | 250 |
|---|---|---|---|---|---|---|
| Control G | 47.93 | 1.44 | 20.05 | 29.80 | 0.76 | 0.02 |
| Example 5 | 0.05 | 0.18 | 67.75 | 32.00 | 0.02 | 0 |
| Example 6 | 0.28 | .050 | 5.40 | 89.62 | 4.18 | 0.02 |
| Example 7 | 1.33 | 1.39 | 2.77 | 93.04 | 1.44 | 0.03 |
| Example 8 | 3.98 | 0.91 | 7.64 | 86.86 | 0.58 | 0.03 |
| Example 9 | 13.51 | 1.21 | 50.69 | 34.42 | 0.16 | 0.01 |

EXAMPLES 10-14

Polycarbonate was fed to a 2½ inch diameter single screw extruder. The molten polycarbonate was extruded through a die housing containing 210 die holes having a diameter of 0.028 inch. A hot face cutter having three cutting blades, and rotated at 4,200 rpm, was used to cut the extruded polycarbonate into pellets at the die face. The median particle size, the particle size dispersion, the skew of the particle distribution, the melt flow value, the extruder feed rate and the density are shown below for Examples 10-14 in Table VII. The respective weight percentages retained on the various sieves of decreasingly smaller mesh size are shown below for Examples 10-14 in Table VIII.

TABLE VII

Examples 10-14

| | Median particle size in microns | Particle size dispersion in microns | Skew | Density, lbs/ft$^3$ | Melt Flow value | Feed Rate, lbs/hr |
|---|---|---|---|---|---|---|
| Example 10 | 705 | 30 | 0.17 | 40.6 | 14.5 | 100 |
| Example 11 | 710 | 60 | 0 | 38.7 | 14.5 | 150 |
| Example 12 | 795 | 45 | 0 | 42.5 | 3.5 | 200 |
| Example 13 | 800 | 40 | 0 | 43.1 | 3.5 | 150 |
| Example 14 | 770 | 40 | 0 | 43.7 | 3.5 | 100 |

TABLE VIII

Examples 10-14

Percent of sample retained on each sieve (mesh size in microns)

| | 2,000 | 1,000 | 850 | 710 | 500 | 250 |
|---|---|---|---|---|---|---|
| Example 10 | 0 | 0.07 | 0.63 | 48.02 | 50.90 | 0.38 |
| Example 11 | 0 | 0.32 | 1.64 | 44.14 | 53.87 | 0.03 |
| Example 12 | 0 | 0.07 | 7.71 | 90.97 | 1.25 | 0 |
| Example 13 | 0 | 0.02 | 7.73 | 90.83 | 1.42 | 0 |
| Example 14 | 0 | 0.17 | 2.01 | 94.35 | 3.48 | 0 |

Examples 1-14 show the desirably low particle size dispersion and skew which are characteristic of the polycarbonate pellets of this invention, regardless of the pellet size selected for production. Control G shows the result of using too low a cutter speed, for example less than 2,500 rpm. Sufficient agglomeration of pellets occurred in Control G to raise not only the median particle size, but the particle size dispersion and skew as well, to undesirable levels.

EXAMPLES 15 and 16

Polycarbonate ("PC") with a melt flow rate of 13.5 and acrylonitrile/butadiene/styrene copolymer ("ABS") containing, by weight, 17.0% acrylonitrile, 6.5% butadiene and 76.5% styrene were fed to a 2½ inch diameter single screw extruder at different feed rates. The molten PC/ABS blend was extruded through a die housing containing 210 die holes having a diameter of 0.7 mm. A hot face cutter having three cutting blades, and rotated at 4,250 rpm, was used to cut the extruded PC/ABS blend into pellets at the die face. The median particle size, the particle size dispersion, the skew of the particle distribution, the component feed rate, the speed, melt temperature and pressure (before the die plate) of the extruder, and the density are shown below for Examples 15 and 16 in Table IX. The respective weight percentages retained on the various sieves of decreasingly smaller mesh size are shown below for Examples 15 and 16 in Table X.

TABLE IX

Examples 15 and 16

| | Example 15 | Example 16 |
|---|---|---|
| Median Particle Size | 800 | 925 |
| Particle Size Dispersion | 40 | 33 |
| Skew | 0 | 0.08 |
| Density | 41 | 41 |
| Polycarbonate Feed Rate, lbs/hr | 132 | 198 |

TABLE IX-continued

Examples 15 and 16

| | Example 15 | Example 16 |
|---|---|---|
| ABS Feed Rate, lbs/hr | 68 | 102 |
| Extruder Speed, rpm | 80 | 150 |
| Extruder Melt Temperature, °C. | 300 | 303 |
| Extruder Melt Pressure, psi | 550 | 940 |

TABLE X

Examples 15 and 16

Percent of sample retained on each sieve (mesh size in microns)

| | 2,000 | 1,000 | 850 | 710 | 500 | 250 |
|---|---|---|---|---|---|---|
| Example 15 | 0 | 0.32 | 8.16 | 90.76 | 0.73 | 0 |
| Example 16 | 0 | 1.02 | 98.11 | 0.87 | 0 | 0 |

Examples 15 and 16 show the desirably low particle size dispersion and skew which are characteristic of the pellets of this invention when they are prepared from polycarbonate blended with another polymer, for example ABS.

It is within the skill in the art to practice this invention in numerous modifications and variations in light of the above teachings. It is, therefore, to be understood that changes may be made in the various described embodiments of this invention without departing from the spirit and scope of this invention as defined by the appended claims.

What is claimed is:

1. A composition of matter comprising aromatic polycarbonate pellets characterized in that
   (a) the median particle size of said pellets is between 250 and 1,000 microns;
   (b) the particle size dispersion of said pellets is less than 100 microns; and
   (c) the skew of the particle distribution is less than 0.25;

each as determined according to ASTM Designation D 1921-63.

2. The aromatic polycarbonate pellets of claim 1 characterized in that the particle size dispersion of said pellets is less than 60 microns.

3. The aromatic polycarbonate pellets of claim 1 characterized in that the particle size dispersion of said pellets is less than 40 microns.

4. A composition of matter comprising aromatic polycarbonate pellets characterized in that
   (a) the median particle size of said pellets is between 500 to 900 microns;
   (b) the particle size dispersion of said pellets is less than 100 microns: and
   (c) the skew of the particle distribution is less than 0.25;

each as determined according to ASTM Designation D 1921-63.

5. The aromatic polycarbonate pellets of claim 4 characterized in that the particle size dispersion of said pellets is less than 60 microns.

6. The polycarbonate pellets of claim 4 characterized in that the particle size dispersion of said pellets is less than 40 microns.

7. A composition of matter comprising aromatic polycarbonate pellets characterized in that
   (a) the median particle size of said pellets is between 600 to 800 microns;
   (b) the particle size dispersion of said pellets is less than 100 microns; and
   (c) the skew of the particle distribution is less than 0.25;
each as determined according to ASTM Designation D 1921-63.

8. The aromatic polycarbonate pellets of claim 7 characterized in that the particle size dispersion of said pellets is less than 60 microns.

9. The aromatic polycarbonate pellets of claim 7 characterized in that the particle size dispersion of said pellets is less than 40 microns.

10. The aromatic polycarbonate pellets of claim 1, 2, 3, 4, 5, 6, 7, 8 or 9 characterized in that the skew of the particle distribution is less than 0.1.

11. The aromatic polycarbonate pellets of claim 1, 2, 3, 4, 5, 6, 7, 8 or 9 characterized in that the skew of the particle distribution is less than 0.05.

12. A composition of matter comprising aromatic polycarbonate pellets characterized in that,
   (a) after said polycarbonate pellets have been agitated on a screen having a mesh opening size of 850 microns, and after those pellets not retained on said 850 micron screen have then been agitated on a screen having a mesh opening size of 710 microns, the portion of said pellets which together is retained on one or the other of said screens is more than 85% by weight; and
   (b) none of said pellets are retained after agitation on a mesh screen having a mesh opening size of 1,500 microns or more.

13. The composition of claim 12 wherein more than 90% by weight of said pellets are together retained on one or the other of said screens.

14. The composition of claim 12 wherein more than 95% by weight of said pellets are together retained on one or the other of said screens.

15. The aromatic polycarbonate pellets of claim 12, 13 or 14 which are formed by cutting polycarbonate which has been forced through a die.

16. The aromatic polycarbonate pellets of claim 15 which are formed by cutting polycarbonate which has been forced through a die hole having a diameter of about 0.25 mm to about 0.8 mm.

17. The aromatic polycarbonate pellets of claim 16 which are formed by cutting molten polycarbonate at the face of a die.

18. The aromatic polycarbonate pellets of claim 15 which are cylindrical in shape.

19. The aromatic polycarbonate pellets of claim 15 in the form of a batch of pellets which weighs at least 150 pounds.

20. The aromatic polycarbonate pellets of claim 18 wherein the cylinder has a length/diameter ratio of 2/1 to $\frac{1}{2}$.

21. The aromatic polycarbonate pellets of claim 10 which are formed by cutting polycarbonate which has been forced through a die.

22. The aromatic polycarbonate pellets of claim 10 which are formed by cutting polycarbonate which has been forced through a die hole having a diameter of about 0.25 mm to about 0.8 mm.

23. The aromatic polycarbonate pellets of claim 22 which are formed by cutting molten polycarbonate at the face of a die.

24. The aromatic polycarbonate pellets of claim 10 which are cylindrical in shape.

25. The aromatic polycarbonate pellets of claim 24 wherein the cylinder has a length/diameter ratio of 2/1 to $\frac{1}{2}$.

26. The polycarbonate pellets of claim 10 in the form of a batch of pellets which weighs at least 150 pounds.

27. The aromatic polycarbonate pellets of claim 11 which are formed by cutting polycarbonate which has been forced through a die.

28. The aromatic polycarbonate pellets of claim 11 which are formed by cutting polycarbonate which a been forced through a die hole having a diameter of about 0.25 mm to about 0.8 mm.

29. The aromatic polycarbonate pellets of claim 28 which are formed by cutting molten polycarbonate at the face of a die.

30. The aromatic polycarbonate pellets of claim 11 which are cylindrical in shape.

31. The aromatic polycarbonate pellets of claim 30 wherein the cylinder has a length/diameter ratio of 2/1 to $\frac{1}{2}$.

32. The polycarbonate pellets of claim 11 in the form of a batch of pellets which weights at least 150 pounds.

33. The aromatic polycarbonate pellets of claim 1, 2, 3, 4, 5, 6, 7, 8, 9, 12, 13 or 14 wherein the polycarbonate is prepared from 2,2-bis(4-hydroxyphenyl)propane.

* * * * *